(12) United States Patent
Nakasawa et al.

(10) Patent No.: US 11,656,238 B2
(45) Date of Patent: May 23, 2023

(54) AUTOMATIC ANALYZER

(71) Applicant: Hitachi High-Technologies Corporation, Tokyo (JP)

(72) Inventors: Takashi Nakasawa, Tokyo (JP); Tetsuji Kawahara, Tokyo (JP); Masaharu Nishida, Tokyo (JP); Yoko Inoue, Tokyo (JP); Kenichi Yagi, Tokyo (JP); Osamu Matsumoto, Tokyo (JP); Sayaka Asada, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 327 days.

(21) Appl. No.: 16/473,687

(22) PCT Filed: Jan. 12, 2018

(86) PCT No.: PCT/JP2018/000575
§ 371 (c)(1),
(2) Date: Jun. 26, 2019

(87) PCT Pub. No.: WO2018/135384
PCT Pub. Date: Jul. 26, 2018

(65) Prior Publication Data
US 2019/0346468 A1 Nov. 14, 2019

(30) Foreign Application Priority Data
Jan. 23, 2017 (JP) .............................. JP2017-009086

(51) Int. Cl.
G01N 35/02 (2006.01)
G01N 21/03 (2006.01)
(Continued)

(52) U.S. Cl.
CPC ............ *G01N 35/025* (2013.01); *G01N 21/03* (2013.01); *G01N 21/76* (2013.01); *G01N 21/82* (2013.01);
(Continued)

(58) Field of Classification Search
CPC ...... G01N 35/025; G01N 21/03; G01N 21/76; G01N 21/82; G01N 35/0092; G01N 35/04;
(Continued)

(56) References Cited

U.S. PATENT DOCUMENTS 5,320,966 A * 6/1994 Mitsumaki ......... G01N 35/0092
422/116
9,297,818 B2 * 3/2016 Fujita ..................... G01N 35/10
(Continued)

FOREIGN PATENT DOCUMENTS

WO 2014/171346 A1 10/2014
WO 2015/115210 A1 8/2015
WO WO-2015115210 A1 * 8/2015 .............. B01L 3/527

OTHER PUBLICATIONS

International Search Report of PCT/JP2018/000575 dated Apr. 17, 2018.
(Continued)

Primary Examiner — Jill A Warden
Assistant Examiner — John McGuirk
(74) Attorney, Agent, or Firm — Mattingly & Malur, PC

(57) ABSTRACT

The automatic analyzer includes a storage unit storing the reaction containers of cleaning target by day unit in such a manner that all the reaction containers mounted on a reaction disk are to be cleaning target within a plurality of days, and a control unit exerts a control in such a manner that during an operation state after the sample of analysis object is dispensed to the reaction containers, a sample of analysis
(Continued)

object in each of the reaction containers is analyzed, and not the sample but a detergent is dispensed to the reaction containers of cleaning target of an appointed day, the reaction containers of cleaning target of the appointed day being stored in the storage unit, to soak and wash the reaction containers for a certain time.

12 Claims, 10 Drawing Sheets

(51) Int. Cl.
    *G01N 35/00*     (2006.01)
    *G01N 35/04*     (2006.01)
    *G01N 21/76*     (2006.01)
    *G01N 21/82*     (2006.01)

(52) U.S. Cl.
    CPC .......... *G01N 35/0092* (2013.01); *G01N 35/04* (2013.01); *G01N 2035/0437* (2013.01); *G01N 2035/0453* (2013.01)

(58) Field of Classification Search
CPC ... G01N 2035/0437; G01N 2035/0453; G01N 2201/0415; G01N 21/253; G01N 21/274; G01N 21/11; G01N 2021/115; G01N 21/15; G01N 2035/0094
See application file for complete search history.

(56) References Cited

U.S. PATENT DOCUMENTS

| | | |
|---|---|---|
| 2012/0318302 A1 | 12/2012 | Nakayama |
| 2015/0346231 A1* | 12/2015 | Mori ................. G01N 35/1004 422/67 |
| 2016/0061852 A1 | 3/2016 | Takayama et al. |
| 2016/0341753 A1 | 11/2016 | Saito et al. |

OTHER PUBLICATIONS

Extended European Search Report received in corresponding European Application No. 18741547.6 dated Jul. 13, 2020.

* cited by examiner

FIG. 3

| CYCLE NO | REACTION CHAMBER NO | CYCLE NO | REACTION CHAMBER NO | CYCLE NO | REACTION CHAMBER NO | CYCLE NO | REACTION CHAMBER NO | CYCLE NO | REACTION CHAMBER NO | CYCLE NO | REACTION CHAMBER NO | CYCLE NO | REACTION CHAMBER NO |
|---|---|---|---|---|---|---|---|---|---|---|---|---|---|
| 1 | 1 | 33 | 83 | 65 | 165 | 97 | 26 | 129 | 108 | 161 | 190 | 193 | 51 |
| 2 | 45 | 34 | 127 | 66 | 209 | 98 | 70 | 130 | 152 | 162 | 13 | 194 | 95 |
| 3 | 89 | 35 | 171 | 67 | 32 | 99 | 114 | 131 | 196 | 163 | 57 | 195 | 139 |
| 4 | 133 | 36 | 215 | 68 | 76 | 100 | 158 | 132 | 19 | 164 | 101 | 196 | 183 |
| 5 | 177 | 37 | 38 | 69 | 120 | 101 | 202 | 133 | 63 | 165 | 145 | 197 | 6 |
| 6 | 221 | 38 | 82 | 70 | 164 | 102 | 25 | 134 | 107 | 166 | 189 | 198 | 50 |
| 7 | 44 | 39 | 126 | 71 | 208 | 103 | 69 | 135 | 151 | 167 | 12 | 199 | 94 |
| 8 | 88 | 40 | 170 | 72 | 31 | 104 | 113 | 136 | 195 | 168 | 56 | 200 | 138 |
| 9 | 132 | 41 | 214 | 73 | 75 | 105 | 157 | 137 | 18 | 169 | 100 | 201 | 182 |
| 10 | 176 | 42 | 37 | 74 | 119 | 106 | 201 | 138 | 62 | 170 | 144 | 202 | 5 |
| 11 | 220 | 43 | 81 | 75 | 163 | 107 | 24 | 139 | 106 | 171 | 188 | 203 | 49 |
| 12 | 43 | 44 | 125 | 76 | 207 | 108 | 68 | 140 | 150 | 172 | 11 | 204 | 93 |
| 13 | 87 | 45 | 169 | 77 | 30 | 109 | 112 | 141 | 194 | 173 | 55 | 205 | 137 |
| 14 | 131 | 46 | 213 | 78 | 74 | 110 | 156 | 142 | 17 | 174 | 99 | 206 | 181 |
| 15 | 175 | 47 | 36 | 79 | 118 | 111 | 200 | 143 | 61 | 175 | 143 | 207 | 4 |
| 16 | 219 | 48 | 80 | 80 | 162 | 112 | 23 | 144 | 105 | 176 | 187 | 208 | 48 |
| 17 | 42 | 49 | 124 | 81 | 206 | 113 | 67 | 145 | 149 | 177 | 10 | 209 | 92 |
| 18 | 86 | 50 | 168 | 82 | 29 | 114 | 111 | 146 | 193 | 178 | 54 | 210 | 136 |
| 19 | 130 | 51 | 212 | 83 | 73 | 115 | 155 | 147 | 16 | 179 | 98 | 211 | 180 |
| 20 | 174 | 52 | 35 | 84 | 117 | 116 | 199 | 148 | 60 | 180 | 142 | 212 | 3 |
| 21 | 218 | 53 | 79 | 85 | 161 | 117 | 22 | 149 | 104 | 181 | 186 | 213 | 47 |
| 22 | 41 | 54 | 123 | 86 | 205 | 118 | 66 | 150 | 148 | 182 | 9 | 214 | 91 |
| 23 | 85 | 55 | 167 | 87 | 28 | 119 | 110 | 151 | 192 | 183 | 53 | 215 | 135 |
| 24 | 129 | 56 | 211 | 88 | 72 | 120 | 154 | 152 | 15 | 184 | 97 | 216 | 179 |
| 25 | 173 | 57 | 34 | 89 | 116 | 121 | 198 | 153 | 59 | 185 | 141 | 217 | 2 |
| 26 | 217 | 58 | 78 | 90 | 160 | 122 | 21 | 154 | 103 | 186 | 185 | 218 | 46 |
| 27 | 40 | 59 | 122 | 91 | 204 | 123 | 65 | 155 | 147 | 187 | 8 | 219 | 90 |
| 28 | 84 | 60 | 166 | 92 | 27 | 124 | 109 | 156 | 191 | 188 | 52 | 220 | 134 |
| 29 | 128 | 61 | 210 | 93 | 71 | 125 | 153 | 157 | 14 | 189 | 96 | 221 | 178 |
| 30 | 172 | 62 | 33 | 94 | 115 | 126 | 197 | 158 | 58 | 190 | 140 | | |
| 31 | 216 | 63 | 77 | 95 | 159 | 127 | 20 | 159 | 102 | 191 | 184 | | |
| 32 | 39 | 64 | 121 | 96 | 203 | 128 | 64 | 160 | 146 | 192 | 7 | | |

FIG. 4

| CELL NO. | OPERATION |
|---|---|
| 221 | WASH CELL |
|  | MEASURE ITEM |
|  | MEASURE ITEM |
|  | MEASURE ITEM |
|  | MEASURE ITEM |
| 220 | WASH CELL |
|  | MEASURE ITEM |
|  | MEASURE ITEM |
|  | MEASURE ITEM |
|  | MEASURE ITEM |
| 219 | WASH CELL |
|  | MEASURE ITEM |
|  | MEASURE ITEM |
|  | MEASURE ITEM |
|  | MEASURE ITEM |
| 218 | WASH CELL |
|  | MEASURE ITEM |
|  | MEASURE ITEM |
|  | MEASURE ITEM |
|  | MEASURE ITEM |
| 217 | WASH CELL |
|  | MEASURE ITEM |
|  | MEASURE ITEM |

FIG.6

REACTION CONTAINER WASHING CYCLE [  55  ] DAYS

ENTER NUMBER 1 TO 5 AS NUMBER OF CYCLE DAYS FOR WASHING ALL REACTION CONTAINERS (a)

REACTION CONTAINER WASHING CYCLE [  56  ] DAYS
1
2
3
4
5
6
7

SELECT NUMBER OF CYCLE DAYS FOR WASHING ALL REACTION CONTAINERS (b)

FIG.7

|  | DAY 1 REACTION CONTAINER NO. | DAY 2 REACTION CONTAINER NO. | DAY 3 REACTION CONTAINER NO. | DAY 4 REACTION CONTAINER NO. | DAY 5 REACTION CONTAINER NO. |
|---|---|---|---|---|---|
| 1 | 221 | 177 | 133 | 89 | 45 |
| 2 | 220 | 176 | 132 | 88 | 44 |
| 3 | 219 | 175 | 131 | 87 | 43 |
| 4 | 218 | 174 | 130 | 86 | 42 |
| 5 | 217 | 173 | 129 | 85 | 41 |
| 6 | 216 | 172 | 128 | 84 | 40 |
| 7 | 215 | 171 | 127 | 83 | 39 |
| 8 | 214 | 170 | 126 | 82 | 38 |
| 9 | 213 | 169 | 125 | 81 | 37 |
| 10 | 212 | 168 | 124 | 80 | 36 |
| 11 | 211 | 167 | 123 | 79 | 35 |
| 12 | 210 | 166 | 122 | 78 | 34 |
| 13 | 209 | 165 | 121 | 77 | 33 |
| 14 | 208 | 164 | 120 | 76 | 32 |
| 15 | 207 | 163 | 119 | 75 | 31 |
| 16 | 206 | 162 | 118 | 74 | 30 |
| 17 | 205 | 161 | 117 | 73 | 29 |
| 18 | 204 | 160 | 116 | 72 | 28 |
| 19 | 203 | 159 | 115 | 71 | 27 |
| 20 | 202 | 158 | 114 | 70 | 26 |
| 21 | 201 | 157 | 113 | 69 | 25 |
| 22 | 200 | 156 | 112 | 68 | 24 |
| 23 | 199 | 155 | 111 | 67 | 23 |
| 24 | 198 | 154 | 110 | 66 | 22 |
| 25 | 197 | 153 | 109 | 65 | 21 |
| 26 | 196 | 152 | 108 | 64 | 20 |
| 27 | 195 | 151 | 107 | 63 | 19 |
| 28 | 194 | 150 | 106 | 62 | 18 |
| 29 | 193 | 149 | 105 | 61 | 17 |
| 30 | 192 | 148 | 104 | 60 | 16 |
| 31 | 191 | 147 | 103 | 59 | 15 |
| 32 | 190 | 146 | 102 | 58 | 14 |
| 33 | 189 | 145 | 101 | 57 | 13 |
| 34 | 188 | 144 | 100 | 56 | 12 |
| 35 | 187 | 143 | 99 | 55 | 11 |
| 36 | 186 | 142 | 98 | 54 | 10 |
| 37 | 185 | 141 | 97 | 53 | 9 |
| 38 | 184 | 140 | 96 | 52 | 8 |
| 39 | 183 | 139 | 95 | 51 | 7 |
| 40 | 182 | 138 | 94 | 50 | 6 |
| 41 | 181 | 137 | 93 | 49 | 5 |
| 42 | 180 | 136 | 92 | 48 | 4 |
| 43 | 179 | 135 | 91 | 47 | 3 |
| 44 | 178 | 134 | 90 | 46 | 2 |
| 45 |  |  |  |  | 1 |

F I G. 8

CASE SATURDAY AND SUNDAY ARE NO-BUSINESS DAYS

| SUN | MON | TUE | WED | THU | FRI | SAT |
|---|---|---|---|---|---|---|
| NO-BUSINESS DAY | BUSINESS DAY DAY 1 | BUSINESS DAY DAY 2 | BUSINESS DAY DAY 3 | BUSINESS DAY DAY 4 | BUSINESS DAY DAY 5 | NO-BUSINESS DAY |
| NO-BUSINESS DAY | BUSINESS DAY DAY 1 | BUSINESS DAY DAY 2 | BUSINESS DAY DAY 3 | BUSINESS DAY DAY 4 | BUSINESS DAY DAY 5 | NO-BUSINESS DAY |
| NO-BUSINESS DAY | BUSINESS DAY DAY 1 | BUSINESS DAY DAY 2 | BUSINESS DAY DAY 3 | BUSINESS DAY DAY 4 | BUSINESS DAY DAY 5 | NO-BUSINESS DAY |
| NO-BUSINESS DAY | BUSINESS DAY DAY 1 | BUSINESS DAY DAY 2 | BUSINESS DAY DAY 3 | BUSINESS DAY DAY 4 | BUSINESS DAY DAY 5 | NO-BUSINESS DAY |

(a)

CASE OF ABSENCE OF NO-BUSINESS DAYS

| SUN | MON | TUE | WED | THU | FRI | SAT |
|---|---|---|---|---|---|---|
| BUSINESS DAY DAY 1 | BUSINESS DAY DAY 2 | BUSINESS DAY DAY 3 | BUSINESS DAY DAY 4 | BUSINESS DAY DAY 5 | BUSINESS DAY DAY 1 | BUSINESS DAY DAY 2 |
| BUSINESS DAY DAY 3 | BUSINESS DAY DAY 4 | BUSINESS DAY DAY 5 | BUSINESS DAY DAY 1 | BUSINESS DAY DAY 2 | BUSINESS DAY DAY 3 | BUSINESS DAY DAY 4 |
| BUSINESS DAY DAY 5 | BUSINESS DAY DAY 1 | BUSINESS DAY DAY 2 | BUSINESS DAY DAY 3 | BUSINESS DAY DAY 4 | BUSINESS DAY DAY 5 | BUSINESS DAY DAY 1 |
| BUSINESS DAY DAY 2 | BUSINESS DAY DAY 3 | BUSINESS DAY DAY 4 | BUSINESS DAY DAY 5 | BUSINESS DAY DAY 1 | BUSINESS DAY DAY 2 | BUSINESS DAY DAY 3 |

(b)

CASE NO-BUSINESS DAY IS IN MIDDLE OF WEEK

| SUN | MON | TUE | WED | THU | FRI | SAT |
|---|---|---|---|---|---|---|
| NO-BUSINESS DAY | BUSINESS DAY DAY 1 | BUSINESS DAY DAY 2 | BUSINESS DAY DAY 3 | BUSINESS DAY DAY 4 | BUSINESS DAY DAY 5 | NO-BUSINESS DAY |
| NO-BUSINESS DAY | BUSINESS DAY DAY 1 | NO-BUSINESS DAY | BUSINESS DAY DAY 2 | BUSINESS DAY DAY 3 | BUSINESS DAY DAY 4 | NO-BUSINESS DAY |
| NO-BUSINESS DAY | BUSINESS DAY DAY 5 | BUSINESS DAY DAY 1 | BUSINESS DAY DAY 2 | NO-BUSINESS DAY | BUSINESS DAY DAY 3 | NO-BUSINESS DAY |
| NO-BUSINESS DAY | BUSINESS DAY DAY 4 | BUSINESS DAY DAY 5 | BUSINESS DAY DAY 1 | BUSINESS DAY DAY 2 | BUSINESS DAY DAY 3 | NO-BUSINESS DAY |

(c)

CASE OF WASHING REACTION SYSTEM AS MAINTENANCE

| SUN | MON | TUE | WED | THU | FRI | SAT |
|---|---|---|---|---|---|---|
| NO-BUSINESS DAY | BUSINESS DAY DAY 1 | BUSINESS DAY DAY 2 | BUSINESS DAY DAY 3 | BUSINESS DAY DAY 4 | BUSINESS DAY DAY 5 | NO-BUSINESS DAY |
| NO-BUSINESS DAY | BUSINESS DAY DAY 1 | BUSINESS DAY DAY 2 | BUSINESS DAY DAY 3 | BUSINESS DAY DAY 4* | BUSINESS DAY DAY 2 | NO-BUSINESS DAY |
| NO-BUSINESS DAY | BUSINESS DAY DAY 3 | BUSINESS DAY DAY 4 | BUSINESS DAY DAY 5 | BUSINESS DAY DAY 1 | BUSINESS DAY DAY 2 | NO-BUSINESS DAY |
| NO-BUSINESS DAY | BUSINESS DAY DAY 3 | BUSINESS DAY DAY 4 | BUSINESS DAY DAY 5 | BUSINESS DAY DAY 1 | BUSINESS DAY DAY 2 | NO-BUSINESS DAY |

* DAY OF MAINTENANCE EXECUTED BY OPERATOR (d)

FIG. 9

| | DAY 1 | DAY 2 | DAY 3 | DAY 4 | DAY 5 |
|---|---|---|---|---|---|
| | REACTION CONTAINER NO. | REACTION CONTAINER NO. | REACTION CONTAINER NO. | REACTION CONTAINER NO. | REACTION CONTAINER NO. |
| 1 | 221 | 177 | 133 | 89 | 45 |
| 2 | 220 | 176 | 132 | 88 | 44 |
| 3 | 219 | 175 | 131 | 87 | 43 |
| 4 | 218 | 174 | 130 | 86 | 42 |
| 5 | 217 | 173 | 129 | 85 | 41 |
| 6 | 216 | 172 | 128 | 84 | 40 |
| 7 | 215 | 171 | 127 | 83 | 39 |
| 8 | 214 | 170 | 126 | 82 | 38 |
| 9 | 213 | 169 | 125 | 81 | 37 |
| 10 | 212 | 168 | 124 | 80 | 36 |
| 11 | 211 | 167 | 123 | 79 | 35 |
| 12 | 210 | 166 | 122 | 78 | 34 |
| 13 | 209 | 165 | 121 | 77 | 33 |
| 14 | 208 | 164 | 120 | 76 | 32 |
| 15 | 207 | 163 | 119 | 75 | 31 |
| 16 | 206 | 162 | 118 | 74 | 30 |
| 17 | 205 | 161 | 117 | 73 | 29 |
| 18 | 204 | 160 | 116 | 72 | 28 |
| 19 | 203 | 159 | 115 | 71 | 27 |
| 20 | 202 | 158 | 114 | 70 | 26 |
| 21 | 201 | 157 | 113 | 69 | 25 |
| 22 | 200 | 156 | 112 | 68 | 24 |
| 23 | 199 | 155 | 111 | 67 | 23 |
| 24 | 198 | 154 | 110 | 66 | 22 |
| 25 | 197 | 153 | 109 | 65 | 21 |
| 26 | 196 | 152 | 108 | 64 | 20 |
| 27 | 195 | 151 | 107 | 63 | 19 |
| 28 | 194 | 150 | 106 | 62 | 18 |
| 29 | 193 | 149 | 105 | 61 | 17 |
| 30 | 192 | 148 | 104 | 60 | 16 |
| 31 | 191 | 147 | 103 | 59 | 15 |
| 32 | 190 | 146 | 102 | 58 | 14 |
| 33 | 189 | 145 | 101 | 57 | 13 |
| 34 | 188 | 144 | 100 | 56 | 12 |
| 35 | 187 | 143 | 99 | 55 | 11 |
| 36 | 186 | 142 | 98 | 54 | 10 |
| 37 | 185 | 141 | 97 | 53 | 9 |
| 38 | 184 | 140 | 96 | 52 | 8 |
| 39 | 183 | 139 | 95 | 51 | 7 |
| 40 | 182 | 138 | 94 | 50 | 6 |
| 41 | 181 | 137 | 93 | 49 | 5 |
| 42 | 180 | 136 | 92 | 48 | 4 |
| 43 | 179 | 135 | 91 | 47 | 3 |
| 44 | 178 | 134 | 90 | 46 | 2 |
| 45 | | | | | 1 |

NUMBERS OF REACTION CONTAINERS PLANNED TO BE WASHED ON PREVIOUS DAY: 178 TO 221

NUMBERS OF REACTION CONTAINERS ACTUALLY WASHED ON PREVIOUS DAY: 192 TO 221

NUMBERS OF REACTION CONTAINERS NOT WASHED ON PREVIOUS DAY: 178 TO 191

NUMBERS OF REACTION CONTAINERS PLANNED TO BE WASHED ON APPOINTED DAY: 134 TO 177

APPOINTED DAY: SET REACTION CONTAINERS WITHIN ABOVE FRAME (134 TO 191) AS CELLS PLANNED TO BE WASHED

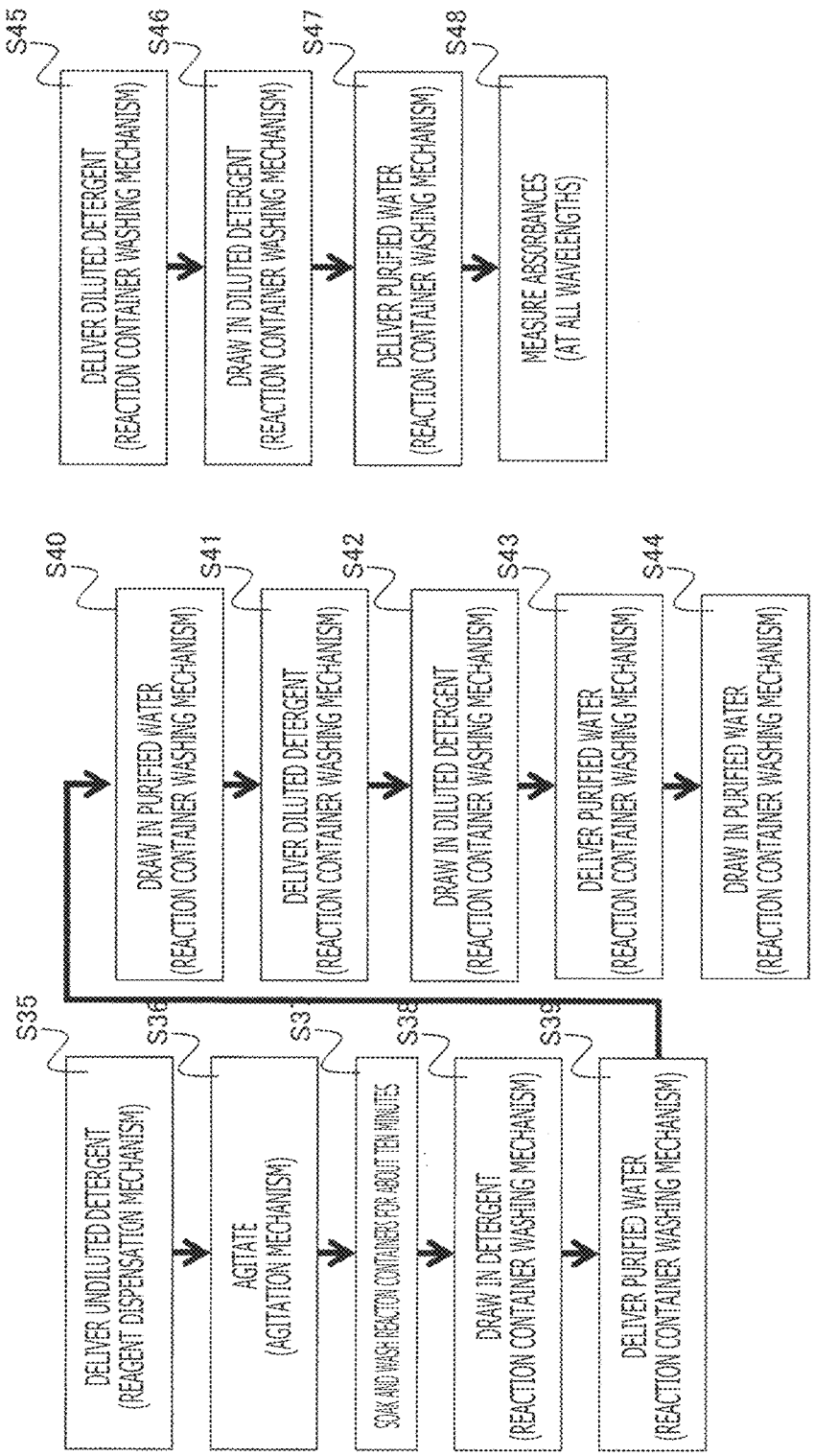

AUTOMATIC ANALYZER

TECHNICAL FIELD

The present invention relates to analyzers for clinical examinations performing qualitative and quantitative analyses on biological samples, such as blood and urine, and in particular to an automatic analyzer having a function of automatically performing maintenance on a reaction container.

BACKGROUND ART

Analyzers for clinical examinations perform measurements of specific components, such as blood and urine, in a biological sample. Typical operations thereof include: dispensing a sample from a sample container into a reaction container with a dedicated nozzle; thereafter, dispensing a reagent from a reagent container into the reaction container with the sample dispensed thereinto with a dedicated nozzle; agitating them and then letting them react with each other for a certain time; and performing a concentration calculation on an intended item from information on absorbance, an amount of luminescence, and the like obtained from a resulting reaction liquid. Usually, a plurality of reaction containers are provided for use in measurements according to the processing capability of the analyzer. These reaction containers are repeatedly used for a certain period of time and also function as a photometric container for measuring absorbance of a reaction liquid obtained as the result of a reaction having progressed in each container. For this reason, each reaction container must be constantly kept clean. Since an identical cell is used repeatedly during an analysis with an analyzer, each container is washed with a diluted dedicated detergent and then purified water each time a measurement is completed. Nevertheless, contamination accumulates. For this reason, in the present circumstances, it is required for an operation to separately perform regular (for example, once per week) maintenance. In an example of such maintenance, a dedicated detergent is supplied to a reaction container without dilution and the container is soaked and washed for approximately 10 minutes at a constant temperature (undiluted detergent washing of reaction container). This undiluted detergent washing of reaction container requires a duration of approximately 15 minutes and during this period of time, the analysis operation must be stopped for maintenance.

Recently, in many facilities, analyzers are operated for 24 hours and thus there is need for an analyzer for which maintenance can be performed without stopping an analysis operation.

Patent Literature 1 describes a method for automatizing reaction container washing in an automatic analyzer.

CITATION LIST

Patent Literature 1: International Publication No. 2015/115210

SUMMARY OF INVENTION

Technical Problem

Patent Literature 1 discloses that a reaction container is soaked and washed during a preparation operation before a sample to be analyzed is actually dispensed into the reaction container after a start button of equipment is pressed. In this disclosure, a reaction container is simply washed with the equipment out of an analysis operation and consideration is not given at all to soaking and washing after a sample is started to be dispensed into the reaction container.

In such an operation as 24-hour operation in which equipment is not stopped, a start button itself is not pressed and soaking and washing cannot be performed. When soaking and washing is necessary, it is required again to stop an analysis operation to secure a maintenance time.

Consequently, it is an object of the present invention to provide an automatic analyzer in which a reaction container can be soaked and washed without completely stopping an analysis operation regardless of whether a start button of the analyzer is pressed or not.

Solution to Problem

A typical configuration of the present invention to solve the above problems is as follows:

A representative embodiment of the present invention is an automatic analyzer including: a reaction disk on which a plurality of reaction containers are mounted; a reagent disk on which a reagent container storing a reagent is mounted; a reagent dispensation mechanism dispensing the reagent stored in the reagent container into the reaction containers; a sample container transport mechanism transporting a sample container storing a sample; a sample dispensation mechanism dispensing a sample stored in the sample container into the reaction containers; and a control unit controlling the reaction disk, the reagent disk, the reagent dispensation mechanism, the sample container transport mechanism, and the sample dispensation mechanism. The reagent dispensation mechanism is capable of dispensing a detergent into the reaction containers. The automatic analyzer further includes a storage unit storing the reaction containers of cleaning target by day unit in such a manner that all the reaction containers mounted on the reaction disk are to be cleaning target within a plurality of days. The control unit analyzes a sample of analysis object during an operation state after the sample to be analyzed is dispensed into the reaction containers and not the sample but the detergent is dispensed into the reaction containers of cleaning target of an appointed day, the reaction containers of cleaning target of the appointed day being stored in the storage unit, and the reaction containers are soaked and washed for a certain time.

Advantageous Effects of Invention

According to the present invention, it is possible to perform maintenance, including soaking and washing, on a reaction container while continuing an analysis even in circumstances in which the analysis is continued.

Other problems, configuration elements, and effects than described above will be apparent from the following description of embodiments.

BRIEF DESCRIPTION OF THE DRAWINGS

FIG. 3 illustrates an order in which the automatic analyzer to which the present invention is applied uses reaction containers by reaction container numbers.

FIG. 4 is a flow diagram illustrating an operation flow of assigning the reaction containers to washing while the automatic analyzer to which the present invention is applied is performing the analysis.

FIG. 6 illustrates an example of a screen indicating that an operator can set a cycle of washing all reaction containers on a GUI of the automatic analyzer.

FIG. 7 illustrates a list of numbers of the reaction containers washed on first to fifth days when the number of days for which the analyzer operates is set to five.

FIG. 8 illustrates plan-out of days for executing soaking and washing when the reaction containers to be washed are distributed equally in number to five days.

FIG. 9 illustrates an example of the reaction containers of cleaning target of an appointed day when some of the reaction containers planned to be washed on a previous day are not washed.

FIG. 10 is a flow diagram illustrating a flow of washing of reaction containers and a flow of maintenance work of cell blank measurement according to a conventional technique.

DESCRIPTION OF EMBODIMENTS

Hereafter, a description will be given to embodiments for carrying out the present invention.

First Embodiment

Hereafter, a description will be given to embodiments for carrying out the present invention with reference to the drawings.

Figure 1:
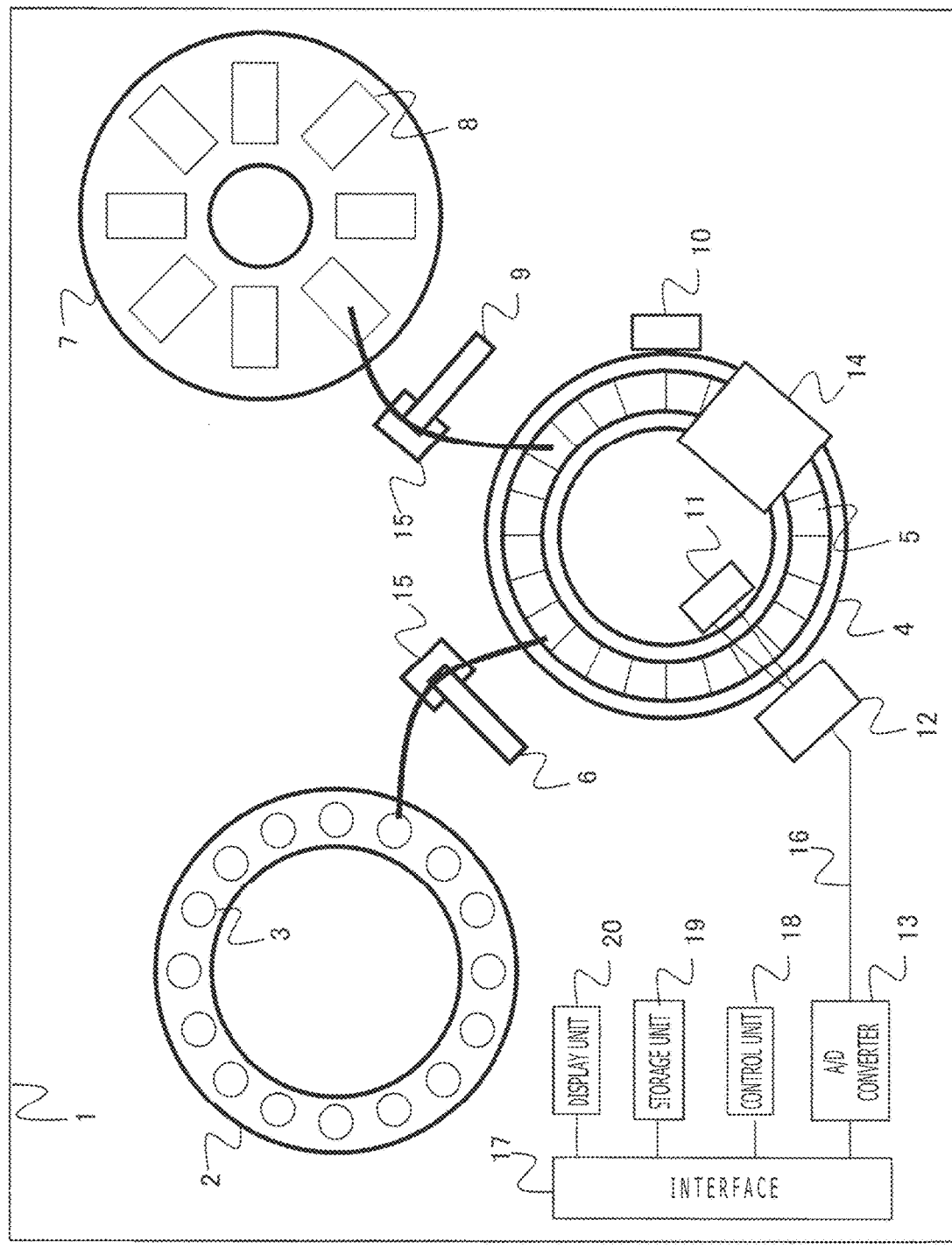
FIG. 1 illustrates a top layout view of principal constituent elements of an automatic analyzer with a conceptual diagram of a control system added thereto.

First, a description will be given to an example of an automatic analyzer to which the present invention is applied. FIG. 1 illustrates a top layout view of principal constituent elements of the automatic analyzer with a conceptional diagram of a control system added thereto. The automatic analyzer to which the present invention is applied is provided with a mechanism taking a predetermined quantity of a liquid, such as sample or reagent, using a dispensation nozzle. In the following description, an automatic analyzer for clinical examinations to analyze a biological sample, such as blood and urine, will be taken as an example.

The automatic analyzer 1 includes: a sample disk 2; sample containers 3 arranged concentrically therewith; a reaction disk 4; reaction containers 5 concentrically arranged; a sample dispensation mechanism 6; reagent containers 8 arranged concentrically with the reagent disk 7 and storing various reagents; a reagent dispensation mechanism 9; an agitation mechanism 10; a light source 11; a photometer (multi-wavelength photometer) 12; an A/D converter 13; a reaction container washing mechanism 14; and a dispensation nozzle washing mechanism 15.

The sample disk 2 is a mechanism transporting a sample container 3 storing a sample to a position where the sample dispensation mechanism 6 can suck the sample. The sample disk 2 is an example of a sample container transport mechanism and in the case of an automatic analyzer using a sample rack, the sample container transport mechanism may be a belt conveyor, a robot hand, or the like transporting the sample rack with sample containers mounted on the sample rack.

The reagent disk 7 is a mechanism on which a reagent container storing a reagent is placed and which performs transportation to a position where the reagent dispensation mechanism 9 can suck the reagent. A detergent container storing a detergent is also placed on the reagent disk 7 as described later.

The reaction disk 4 is a mechanism on which a plurality of reaction containers 5 for letting a sample and a reagent react with each other are placed and repeats rotation and stop in one operation cycle. While a reaction container is at a stop after rotation by an amount equivalent to a predetermined number of reaction containers, the sample dispensation mechanism 6 dispenses a sample into the reaction container 5. While the reaction disk 4 is at a stop, similarly, the reagent dispensation mechanism 9 dispenses a reagent into a reaction container. The sample dispensation mechanism 6 and the reagent dispensation mechanism 9 also repeat suction and delivery of liquid in one operation cycle. However, in cases where the sample dispensation mechanism 6 and the reagent dispensation mechanism 9 are respectively comprised of two dispensation mechanisms, they may respectively repeat suction and delivery of liquid in two operation cycles and continuously deliver liquid once in each operation cycle.

An analysis by the automatic analyzer 1 is performed in accordance with the following order: First, the sample dispensation mechanism 6 dispenses a sample to be analyzed from a sample container 3 into a reaction container 5. Next, the reagent dispensation mechanism 9 dispenses a reagent for use in an analysis from a reagent container 8 into the reaction container 5. Subsequently, agitation of a liquid mixture (hereafter, also referred to as reaction liquid) is performed by the agitation mechanism 10. Light emitted from the light source 11 and applied to the reaction container 5 with the liquid mixture stored therein is detected and measured with the photometer (multi-wavelength photometer) 12 and transmitted to an interface 17 via the A/D converter 13. The light to be detected is transmitted light or scattered light. Based on a result of measurement with the photometer, the control unit 18 outputs a result of analysis on a component of analysis object contained in the sample dispensed into the reaction container to information equipment. For example, the result of analysis is displayed on a display unit 20. The obtained result is stored in the storage unit 19. The dispensation nozzle washing mechanism 15 washes the tip of a dispensation nozzle each time the sample dispensation mechanism 6 and the reagent dispensation mechanism 9 dispenses a sample or a reagent. A reaction container 5 in which a reaction occurred is washed by the reaction container washing mechanism 14 and repeatedly used for the next reaction. These operating mechanisms of the analyzer are all controlled by the control unit 18 via a communication means 16 and the interface 17. Concrete examples of these operating mechanisms are the reaction disk 4, the reagent disk 7, the reagent dispensation mechanism 9, the sample disk 2 (sample container transport mechanism), the sample dispensation mechanism 6, and the like.

An example of the control unit 18 is a controller comprised of CPU, an arithmetic circuit, and the like. The storage unit 19 is a memory such as a hard disk and DRAM.

Figure 2:
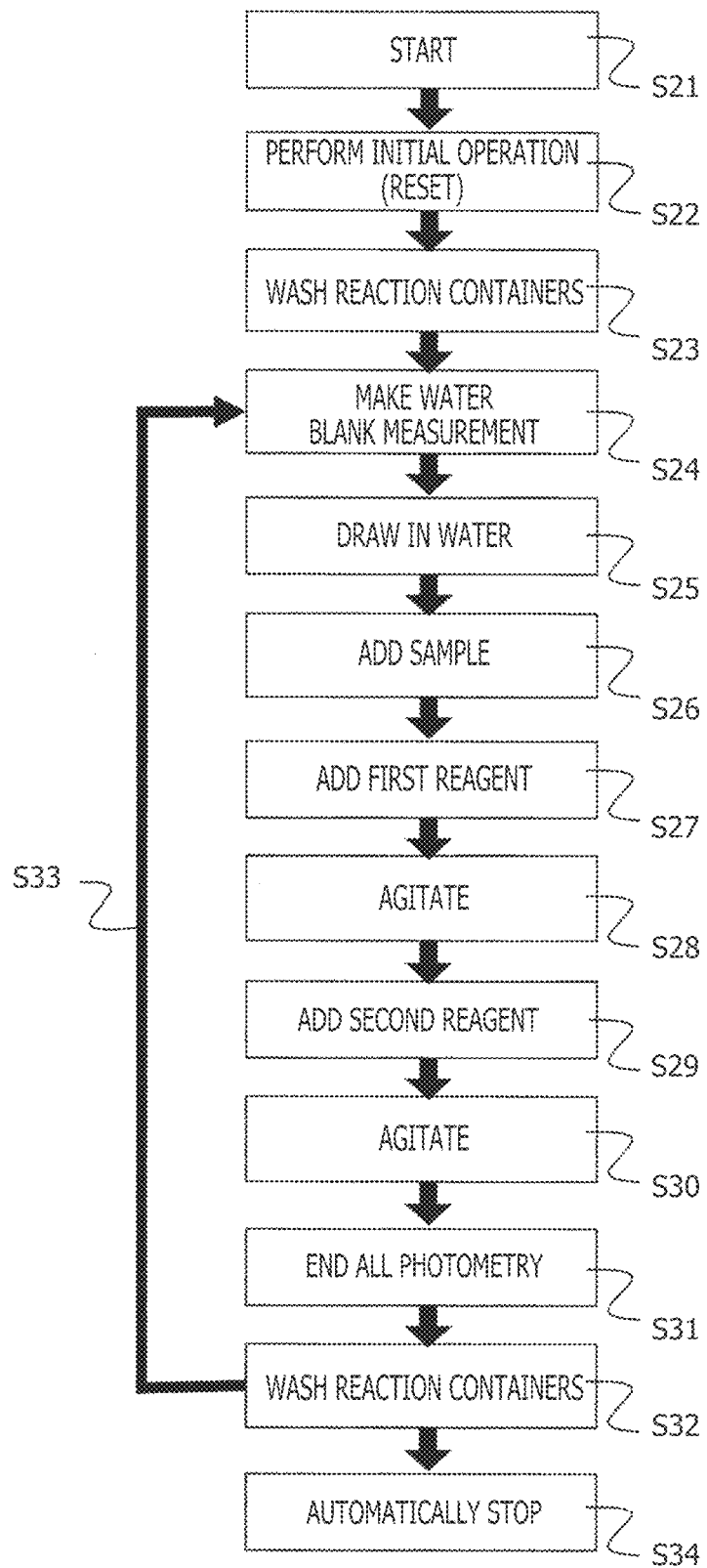
FIG. 2 is a flow diagram illustrating a flow of an analysis performed by the automatic analyzer according to the present invention.

FIG. 2 illustrates a flow (operation flow) of the analysis with the automatic analyzer shown in FIG. 1. With the analyzer in a standby state, an operator instructs the analyzer to start an analysis from a screen or the like (S21). The control unit 18 controls the operation of each of the following steps, S22 to S34. Start of an analysis is not only directly instructed by an operator. Also, in the case of automatic start request from a host computer, the processing of S22 and the following steps is similarly started.

After start is instructed, the initial operation (hereafter, also referred to as reset operation) is performed (S22). After the reset operation is performed, a reaction container is washed (S23). This washing is performed by diluting in the analyzer a detergent for washing reaction containers provided in the analyzer and delivering the detergent into the reaction container. After a certain period of time is waited, the reaction container washing mechanism 14 shown in FIG. 1 sucks the diluted detergent in the reaction container and delivers purified water into the reaction container and a water blank measurement is made on each reaction container (S24). At this time, a cell blank value stored when a cell blank measurement is made is compared with a water blank value. When a difference between these two values exceeds a certain range, the relevant reaction container is not used for analysis and the next and following reaction containers are used. At this time, it is desirable to notify the operator that the relevant reaction container is unusable via GUI (Graphical User Interface) or the like.

A description will be given to cell blank measurement and water blank measurement. Cell blank measurement refers to an operation of washing a reaction container using a detergent and then pouring purified water thereinto and measuring absorbance. A cell blank measurement is usually made on a reaction container washed with an undiluted or a slightly diluted detergent and kept clean. Absorbance at each wavelength obtained from a cell blank measurement is referred to as cell blank value. Usually, a cell blank measurement is a maintenance for which an operator requests a relevant measurement from a maintenance screen of the analyzer and a cell blank value is acquired at once from all the reaction containers, not from each reaction container. A result of a cell blank measurement is updated and stored in the storage unit 19 each time maintenance is performed.

Water blank measurement refers to an operation in which a request for an inspection item is entered to the analyzer and purified water is poured into a reaction container to be used for reaction of the relevant item and absorbance is measured immediately before an actual item analysis. A reaction container into which purified water is to be poured is washed with a detergent diluted before water blank measurement after reaction liquid suction. Absorbance obtained from a water blank measurement is referred to as water blank value. In a water blank measurement, a cell blank value obtained during maintenance and a water blank value obtained immediately before item analysis are compared with each other. When a difference between them exceeds a certain range, the control unit 18 determines that the relevant reaction container involves such an anomaly as contamination and exerts a control to prevent that reaction container from being used in an analysis. That is, the control unit 18 checks whether each reaction container is usable using a cell blank value and a water blank value.

When a difference between a cell blank value and a water blank value is within a certain range, purified water in the relevant reaction container is drawn in (S25). Subsequently, a sample to be analyzed is added by the sample dispensation mechanism 6 in FIG. 1 (S26). After addition of the sample, a first reagent is subsequently added (S27). A reaction liquid of the sample and the first reagent is agitated (S28). Thereafter, a second reagent is added and agitated if necessary (S29, S30). After addition of the reagent, absorbance of the reaction liquid is measured at certain time intervals (S31). After a certain time has passed, the reaction liquid is sucked with the reaction container washing mechanism 14 in FIG. 1 and a diluted detergent is added and the reaction container is washed (S32). When there is an instruction of the next analysis, the reaction container is returned to the operation flow of water blank measurement (S24) for use in the next analysis (S33). When there is not an instruction of the next analysis at all at this time, the analyzer is automatically stopped and transitions to a standby state (S34).

FIG. 3 illustrates an exemplary order in which the automatic analyzer to which the present invention is applied uses reaction containers indicated by reaction container numbers. The left side of each row indicates a cycle number and the right side indicates a reaction container number. This example is based on an assumption that 221 reaction containers are provided in the analyzer and 44 reaction containers are moved in each operation cycle. When the analyzer performs an analysis, for example, reaction container number 1 is used in operation cycle 1 and subsequently, reaction container numbers 45, 89, 133, and 177 are respectively used in operation cycles 2, 3, 4, and 5. In operation cycle 6, 221 reaction containers have made one round; therefore, a reaction container number to be used is 44. "Used" cited here means that a sample is dispensed into the relevant reaction container. The reaction container numbers are serially given in one direction. That is, relative to a dispensation position where the sample dispensation mechanism 6 dispenses a sample, a reaction container of reaction container number 1 is positioned and stopped at the dispensation position in operation cycle 1 and reaction containers of reaction container numbers 45, 89, 133, and 177 are respectively positioned and stopped at the dispensation position in operation cycles 2 to 5.

FIG. 4 illustrates an exemplary operation flow in which the automatic analyzer to which the present invention is applied assigns reaction container washing during an analysis. This example shows an operation in which once for five cycles of the operation cycles of the analyzer, a reaction container to be used in that cycle is washed. (This is referred to as cell washing). Cell number is equivalent to reaction container number. Cell washing will be described in detail with reference to FIG. 5. Thus, while an analysis is continued in reaction containers not subject to cell washing, reaction container washing is regularly or intentionally assigned. This makes it possible to perform washing maintenance in such a manner that degradation in analysis processing capability is minimized and interruption of continuous analysis is prevented.

Figure 5:
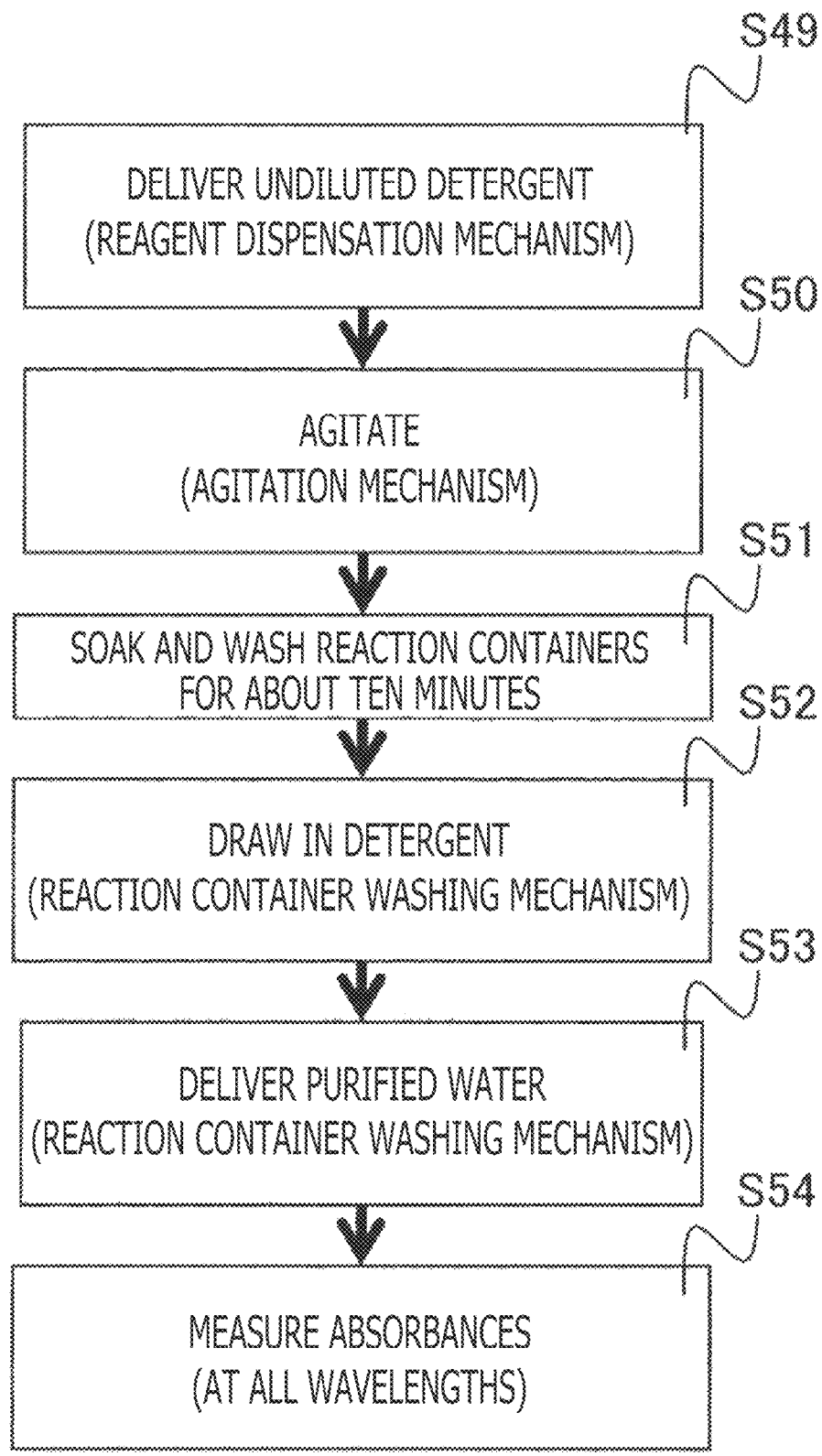
FIG. 5 is a flow diagram illustrating a flow of soaking and washing the reaction containers during an operation state according to the present invention.

FIG. 5 illustrates a flow of soaking and washing reaction containers during an operation state after a sample of analysis object is dispensed into reaction containers. In maintenance operation according to this embodiment, all the reaction containers are not washed at once but reaction containers assigned to reaction container washing by the analyzer are washed. Hereafter, the control unit 18 controls the operation of each step of S49 to S54.

First, the sample dispensation mechanism 6 does not dispense a sample into reaction containers of cleaning target. The reagent dispensation mechanism 9 delivers an undiluted detergent (stock solution) into the reaction containers (S49). For example, it will be supposed that the dispensation position where the sample dispensation mechanism 6 dispenses a sample and the dispensation position where the reagent dispensation mechanism 9 dispenses a reagent are away from each other by an amount equivalent to 44 reaction containers which is equivalent to one operation cycle. Thus, a reaction container (for example, cell number 221) into which a sample was not dispensed at the sample dispensation position arrives at the reagent dispensation position one operation cycle later as is emptied. At this time, the reagent dispensation mechanism 9 draws in a detergent from a detergent container stored in the reagent disk and delivers the detergent into the empty reaction container (cell number 221).

For undiluted detergent washing, a dedicated detergent filled in the detergent containers set in the reagent disk 7 is used. When a quantity of the reagent is insufficient to wash reaction containers on the appointed day, it is desirable to provide a function of prompting an operator to replenish the detergent by alarm or on a screen (GUI or the like). It is advisable to allow detergent containers to be set in a position different from that of the reagent disk 7 and accessible for the reagent dispensation mechanism 9 and dispense a detergent therefrom. In any case, the reagent dispensation mechanism 9 is configured to be capable of dispensing a detergent into a reaction container.

Subsequently, the agitation mechanism 10 agitates the detergent (S50). This agitating action is not indispensable and it is desirable to perform it if possible. This is because the effect of washing with a detergent can be enhanced. Thereafter, the reaction containers storing the detergent are repeatedly rotated and stopped for approximately 10 minutes equivalent to approximately 200 operation cycles and soaked and washed (soaking and washing) (S51). Thereafter, the reaction container washing mechanism 14 draws in the detergent from the reaction containers and delivers purified water (S52, S53).

Lastly, an absorbance measurement (cell blank value) is made at all the wavelengths (S54). With respect to cell blank value at this time, absorbance is measured at all the wavelengths measurable with the analyzer and measurement results are stored in the storage unit 19 as the current cell blank values of the individual reaction containers. This measurement of cell blank value is made with the same timing as timing with which a water blank value is acquired and with purified water poured into each reaction container after drawing in of the detergent.

In usual cases, washing with a detergent delivered by the reaction container washing mechanism 14 is performed also before an item analysis. This washing operation before an item analysis is intended to determine a state of contamination arising from a reaction liquid produced at that time or whether a reaction container is in a usable state before use in an analysis. Therefore, soaking and washing with a diluted detergent for several tens of seconds to two or three minutes is sufficient. However, a purpose of washing operation in the present invention is to remove contamination accumulated in reaction containers repeatedly and continuously used. Consequently, an operation of soaking and washing with undiluted detergent for approximately 10 minutes is incorporated in a series of operations in an operation state. As a result, soaking and washing maintenance can be performed on reaction containers even while an analysis is being continued.

Meanwhile, reaction containers other than those of cleaning target are used in an item analysis, which is performed in accordance with the analysis flow shown in FIG. 2. That is, during an operation state after a sample was dispensed into reaction containers, the control unit 18 controls the sample dispensation mechanism, the reaction disk, and the reagent dispensation mechanism in such a manner that a sample of analysis object is analyzed in each reaction container and not a sample but a detergent is dispensed and soaking and washing is performed for a certain period of time. Which reaction container is to be taken as a cleaning target will be described later.

FIG. 6 illustrates an example of a screen indicating that an operator can set a cycle of washing all reaction containers on GUI of the analyzer. In other words, it is a screen that allows a number of reaction containers to be washed per day to be set. A number of reaction containers to be washed per day may be arbitrarily determined by an operator according to how the relevant facility is operated. However, by washing all the reaction containers within at least one week, a more stable measurement can be made without stopping an analysis to secure a time for washing maintenance on reaction containers. Here, a description will be given to an exemplary case where all the reaction containers are substantially evenly divided by an operator specified number of days.

FIG. 6(*a*) illustrates an example of a screen from which an operator directly input a number of days as a reaction container washing cycle. An operator enters a number of days within which all the reaction containers should be washed into a number-of-days input box 55 from a keyboard or the like. FIG. 6(*b*) illustrates an example of a screen in which a number of days within which the reaction containers should be washed is selected from a pull-down. When an operator desires to change a number of days within which the reaction containers should be washed, the operator selects a desired number of days from a pull-down box 56. For example, entry or selection of 1 means that all the reaction containers are to be washed within one day and entry or selection of 2 means that all the reaction containers are to be washed within two days. In any case, an operator can set a number of days of a reaction container washing cycle and the control unit 18 identifies a number of reaction containers or a reaction container number subjected to approximately 10-minute soaking and washing.

A more specific description will be given. When 2 or a higher number is entered, the control unit 18 stores reaction containers of cleaning target by day unit in the storage unit 19 in such a manner that all the reaction containers mounted on the reaction disk will be taken as cleaning target within the entered number of days. The control unit 18 may make a calculation and assign reaction containers as cleaning target at the point of time of entry. Alternatively, a predetermined cleaning target list or the like may be stored beforehand for each number of days and reaction containers of cleaning target determined from the list may be assigned based on an entered number of days and stored in the storage unit 19. Since this washing is intended to remove contamination accumulated in reaction containers repeatedly and continuously used, reaction containers are assigned as cleaning target regardless of a number of times of usage of reaction containers or a number of times of usage in an analysis for a predetermined item.

Consequently, it is desirable to provide the display unit 20 for setting a number of a plurality of days on which all the reaction containers are taken as cleaning target as a number of days of a reaction container washing cycle. It is desirable that the control unit 18 should set a number of reaction containers to be cleaning target by day unit based on a number of days set on the display unit 20 and store reaction containers of cleaning target by day unit in the storage unit 19 based on the set number of reaction containers. When it is assumed that a number of days of a washing cycle is m (m is an integer equal to or greater than 2), the control unit 18 assigns reaction containers of cleaning target for each day from a first day to an m-th day and causes a detergent to be dispensed into the reaction containers of cleaning target for each day. Thus, a control is exerted in such a manner that when m days have passed, the detergent is dispensed into all the reaction containers and soaking and washing is performed for a certain period of time. As a result, the analyzer itself automatically makes assignment without need for an operator to assign reaction containers of cleaning target by him/herself and this makes troublesome setting unnecessary. In addition, an operator can arbitrarily set a washing cycle and make setting in accordance with the operating mode of each facility by reducing or increasing a lowering rate of processing capability for each day.

When a setting of a number of days is changed to any other number of days, the control unit 18 stores reaction containers of new cleaning target by day unit in the storage unit according to the changed number of days. For example, when 6 is taken as a washing cycle, 36 containers are assigned for a first day and 37 containers are assigned for each of second to sixth days and reaction container numbers of 221 to 186, 185 to 149, 148 to 112, 111 to 75, 74 to 38, and 37 to 1 are assigned for respective days.

FIG. 7 illustrates a list of numbers of reaction containers washed on first to fifth days when the number of days for which the analyzer is operated is set to five. The list is an example in which reaction containers are divided to five days on the assumption that degradation in processing capability encountered when all (221 in this example) the reaction containers are washed in one day is unacceptable for the relevant facility. FIG. 7 is equivalent a case where a cycle is set to five days in FIG. 6.

An automatic analyzer with an operation cycle of 3.6 seconds (1000 tests/hour) will be assumed. When one washing operation is assigned to every five cycles, a time of 3.6 seconds×221 containers=795.6 seconds (approximately 13 minutes) is required to skip an analysis to wash 221 reaction containers; therefore, processing capability is degraded to 4/5 (800 tests/hour) for 13 minutes. This embodiment implements a method in which 221 reaction containers are divided to five days for washing and a period of time for which a day's specimen analysis is interfered with is thereby minimized as much as possible. This method will be described as an example.

When 221 reaction containers are substantially evenly divided to five days, a calculation can be made by dividing 44 containers to each of four days and 45 containers to one day. Up to 45 reaction containers are washed per day. Thus, a period of time for which processing capability per day for reaction container washing is degraded to 4/5 is reduced to 3.6 seconds×45 containers=162 seconds (approximately three minutes) and the processing capability of the analyzer can be efficiently utilized.

In this example, reaction containers are washed in the order from a higher reaction container number to a lower reaction container number. However, it is mainly important that reaction containers are divided to substantially equal numbers and washing order may be ascending order, descending order, or random order. Division of reaction containers by day unit means that soaking and washing is performed once a day. Once soaking and washing is completed, a sample is thereafter dispensed into the relevant reaction container for analysis in that day.

It is described above that washing order may be random; however, it is desirable that reaction containers of cleaning target should be assigned so as to meet any of the following conditions:

(1) In all the reaction containers of cleaning target by day unit, soaking and washing should not continuously occur. A more specific description will be given. If all the reaction containers are continuously taken as reaction containers of cleaning target, processing capability would be accordingly locally and significantly degraded; therefore, it is desirable to distribute reaction containers of cleaning target to some extent. To prevent all the reaction containers from being taken as reaction containers of cleaning target, the following measure is taken: reaction containers of cleaning target are stored in the storage unit 19 in such a manner that all the reaction containers of cleaning target by day unit will not continuously arrive at the sample dispensation position of the sample dispensation mechanism; and the control unit 18 exerts a control in such a manner that a sample to be dispensed is dispensed into reaction containers while a detergent is dispensed into all the reaction containers of cleaning target with respect to the reaction containers of cleaning target for the appointed day stored in the storage unit 19.

(2) Soaking and washing should regularly occur in reaction containers of cleaning target by day unit. By adopting a distributed mode and regularly distributing reaction containers, degradation in processing capability can be suppressed more favorably than cases where reaction containers are biasedly distributed. To implement this, the following measure is taken: reaction containers of cleaning target are stored in the storage unit 19 in such a manner that reaction containers of cleaning target by day unit regularly arrive at the sample dispensation position; and the control unit 18 exerts a control in such a manner that not a sample but a detergent is regularly dispensed and soaking and washing is performed for a certain period of time while a sample of analysis object is dispensed into reaction containers based on reaction containers of cleaning target for the appointed day stored in the storage unit 19. For example, soaking and washing can be continued three times and sample dispensation can be continued twice and this operation can be repeated.

(3) Soaking and washing should not repeatedly occur in reaction containers of cleaning target by day unit. By distributing reaction containers like this, sample dispensation occurs once for twice without fail and processing capability is never degraded to less than 1/2. To implement this, the following measure is taken: reaction containers of cleaning target are stored in the storage unit 19 in such a manner that at least two of reaction containers of cleaning target by day unit will not continuously arrive at the sample dispensation position; and the control unit 18 exerts a control in such a manner that not a sample but a detergent is regularly dispensed once and soaking and washing is performed for a certain period of time while a sample of analysis object is dispensed into reaction containers based on reaction containers of cleaning target for the appointed day stored in the storage unit 19. For example, sample dispensation can be continued three times and thereafter soaking and washing can be performed once and this operation can be repeated.

(4) A group of adjacent reaction containers should be taken as reaction containers of cleaning target by day unit. By distributing reaction containers like this, soaking and washing can be performed on a group of adjacent reaction containers in a lump. When soaking and washing is performed on a group of adjacent reaction containers in a lump by day unit, an operator can easily identify a reaction container that underwent maintenance. To implement this, successive reaction container numbers are assigned as cleaning target for each day as shown in FIG. 7.

Specifically, with respect to reaction containers of cleaning target by day unit, a group of adjacent reaction containers is stored as reaction containers of cleaning target in the storage unit 19 on condition that a reaction container should be displaced from the original position thereof by an amount equivalent to one reaction container when n operation cycles have passed (n is an integer equal to or greater than 2). The control unit 18 exerts a control in such a manner that a detergent is dispensed into a group of adjacent reaction containers and soaking and washing is performed for a certain period of time based on reaction containers of cleaning target for the appointed day stored in the storage unit 19. The reason why n is not less than 2 is as follows: if the number of operation cycles is 1, soaking and washing would continuously occur in all the reaction containers and this is unfavorable.

When n is 2, sample dispensation and soaking and washing alternately occur. In the example shown in FIG. 3, a reaction container is displaced from the original position thereof by an amount equivalent to one reaction container after five operation cycles have passed; therefore, it is understood that this example illustrates a case where n is 5. A group of adjacent reaction containers arrives at the sample dispensation position after five operation cycles have passed. Therefore, that a group of adjacent reaction containers is taken as cleaning target is substantially equivalent to an operation in which sample dispensation is continued four times and then soaking and washing is performed once. Conversely, as shown in FIG. 4, sample dispensation can be continued four times and then soaking and washing is performed once and this operation can be repeated. This case is substantially equivalent to that successive reaction container numbers are assigned as cleaning target as shown in FIG. 7.

FIG. 8 illustrates plan-out of days for executing soaking and washing when the reaction containers to be washed are distributed equally in number to five days. In this drawing, days of the week are indicated but they are not important and day count is basically on the basis of business day and soaking and washing is performed on a business day.

FIG. 8(a) illustrates assignment made in cases where the analyzer is operated only on weekdays. Soaking and washing for each of first to fifth days is assigned only on weekdays. FIG. 8(b) illustrates assignment made in cases where the analyzer is operated in one month regardless of whether the relevant day is a weekday or a holiday. FIG. 8(c) illustrates assignment made in cases where there is a holiday in the middle of the week. FIG. 8(d) illustrates assignment made in cases where all the reaction containers are washed in progress as a function of maintenance for which an analysis is interrupted in a state other than an operation state. The analyzer may be so configured as to allow an operator to perform soaking and washing of reaction containers by him/herself when a reaction container is contaminated or when a reaction container is replaced. At this time, in cases where a washing cycle on individual reaction containers is equal to soaking and washing according to the present invention, a day on which an operator performed maintenance at his/her own discretion may be counted as first day or the next day may be counted as first day on the control unit side and a number of subsequent days may be calculated. A more specific description will be given. When maintenance in which a detergent is dispensed into all the reaction containers in a state other than an operation state in one day and soaking and washing is performed for a certain period of time under an instruction from an operator is performed, the control unit 18 may take the next day as first day or second day and newly assign reaction containers of cleaning target for each day.

When the analyzer is in a standby state and a start button (analysis start button) is pressed for the first time in that day, the analyzer transitions to an operation state. When a sample of analysis object is dispensed into a reaction container and then the reaction container comes to a place where the reagent dispensation mechanism 9 can access reaction containers of cleaning target for the appointed day stored in the storage unit 18, an operation of delivering a detergent for washing is performed. A reaction container of cleaning target arrives at a place accessible for the reagent dispensation mechanism 9 as is empty. In cases where the analyzer is operated over two days in 24-hour operation or the like (when the analyzer is not in a standby state but is making measurement or waiting for a specimen to be measured next), a day count is updated at 0 a.m. and when a reaction container to be washed next comes to a place accessible for the reagent dispensation mechanism 9 shown in FIG. 1, a detergent for washing is delivered. That is, the control unit 18 can count a first day to an m-th day on the basis of an actual date or a day on which the power to the analyzer is on.

The reason why soaking and washing is performed during an operation state after a sample of analysis object is dispensed into a reaction container is to make it possible to wash a reaction container of cleaning target for each day even in cases where the analyzer is operated over two days in 24-hour operation or the like. Patent Literature 1 describes soaking and washing in an analysis preparation washing process, in which soaking and washing is performed before a sample is dispensed into a reaction container. The analysis preparation washing process takes place and soaking and washing is started only when an analysis start button is pressed. In some cases of 24-hour operation, an operation state is constantly established without a start button being pressed. Even in such a case, according to this embodiment, soaking and washing can be performed even after a 24-hour continuous analysis is performed, which is infeasible with the technology disclosed in Patent Literature 1.

In relation to FIG. 8, a holiday can be set in advance to assign first to fifth days to each day or each day of the week beforehand. A day on which power is on can be counted and a day on which power is off can be considered as a holiday and not counted. Then a day on which power is turned on next can be counted. Subsequently, as shown in FIG. 8(a) or FIG. 8(c), reaction containers of cleaning target may be assigned based on FIG. 7.

In soaking and washing, basically, reaction containers assigned as cleaning target for that day only have to be washed. Therefore, the timing of soaking and washing is not specially limited. However, as mentioned above, it is desirable that a detergent should be delivered when a reaction container to be washed first becomes accessible to the reagent dispensation mechanism 9 after a start button is pressed for the first time for that day or time of 0 a.m. has passed. This is because it is desirable to promptly perform washing so as to prevent a failure to wash.

In cases where the power to the analysis is off for a certain period of time, for example, several days, or longer, undiluted detergent washing may be performed on all the reaction containers at the time of first start after the power to the analyzer is turned on next.

FIG. 9 illustrates an example of the reaction containers of cleaning target of an appointed day when some of the reaction containers planned to be washed on a previous day are not washed. The following case will be taken as an example: a case where reaction containers of No. 178 to No. 221 have been planned to be washed (FIG. 9, DAY 1) and reaction containers of No. 178 to No. 191 were not washed for some reason. In this case, on the appointed day, in addition to the reaction containers of No. 134 to No. 177 originally planned to be washed, the reaction containers of No. 178 to No. 191 that could not be washed on the previous day may also be washed.

In other words, the control unit 18 may exert a control in such a manner that when a detergent was not dispensed into a reaction container of cleaning target assigned for an appointed day and that day passed, on the next day, a detergent is dispensed into remaining reaction containers of cleaning target assigned for the previous day and reaction containers of cleaning target assigned for the next day and soaking and washing is performed for a certain period of time.

Second Embodiment

A detailed description will be given to cell blank measurement after soaking and washing. Soaking and washing itself is completed by drawing-in of a detergent (S52) shown in FIG. 5 but it is desirable to thereafter make cell blank measurement and make absorbance measurement (S54) as well.

FIG. 10 illustrates a flow of washing of reaction containers and a flow of maintenance work of cell blank measurement according to a conventional technique. Conventionally, both washing of reaction containers and maintenance of cell blank measurement used to be performed with an analysis stopped. Especially, in conventional automatic analyzers, it is necessary to wash all the reaction cells using an undiluted detergent before making cell blank measurement. In this operation, after an instruction to make maintenance is issued from an operator, first, the reagent dispensation mechanism 9 delivers a stock solution (undiluted detergent) to a reaction container by way of a reset operation (S35). Subsequently, the agitation mechanism 10 agitates the detergent (S36). Then, soaking and washing is performed (for approximately 10 minutes) with the undiluted detergent kept in (soaking and washing) (S37). The reaction container washing mechanism 14 draws in the detergent, delivers purified water for the purpose of washing, draws in the purified water, delivers a diluted detergent, draws in the diluted detergent, delivers purified water for the purpose of washing, and draws in the purified water (S38 to S44). As cell blank measurement, thereafter, the reaction container washing mechanism 14 delivers a diluted detergent, draws in the diluted detergent, delivers purified water, and makes absorbance measurement (cell blank value measurement) (S45 to S48).

In maintenance of a conventional analyzer, washing with an undiluted detergent is performed on all the reaction container at a time (for approximately 15 to 25 minutes) and then cell blank measurement is made (for approximately 15 minutes). Therefore, it is necessary to stop all the item analyses for approximately 30 to 40 minutes and sometimes this delays a report of a measurement result.

According to this embodiment, meanwhile, as shown in FIG. 5, soaking and washing is performed and then cell blank measurement is made and absorbance is measured during an operation state (S54). At this time, values obtained from past measurement and stored in the storage unit 19 are updated with cell blank values obtained from individual reaction containers and the updated values are stored in the storage unit 19. Since cell blank measurement is made on reaction containers that underwent soaking and washing, the measurement is made on reaction containers assigned as cleaning target, as shown in FIG. 7, not on all the reaction containers.

In the subsequent analysis, a cell blank value in a reaction container to be used is compared with the absorbance (water blank value) of purified water measured immediately before the analysis and the control unit 18 checks whether the reaction container may be used or not. When a result of the comparison reveals that there is a great difference, some cause, such as contamination in the reaction container, is suspected and the control unit 18 controls the various mechanisms to prevent the reaction container from being used in an analysis.

Since reaction container washing must be regularly performed, the following measure is taken: after washing with stock solution is once performed, the relevant reaction container is used in an analysis until the next washing cycle comes and when the washing cycle comes, washing with stock solution is performed again. With the timing with which washing with stock solution is performed, a cell blank value is also updated; therefore, updating of a cell blank value is also synchronized with this washing cycle and is regularly and automatically made.

For example, it is assumed that the reaction container number 211 shown in FIG. 7 is a target of soaking and washing. In this case, as the result of the maintenance operation shown in FIG. 5 being made, a cell blank value for reaction container number 211 is updated to cell blank value A. On a first day, the operation of S24 to S33 shown in FIG. 2 is repeated for reaction container number 211 and the relevant reaction container is used in an analysis. Also, on second to fifth days, reaction container number 211 is similarly used in an analysis. Each time an analysis is made, a water blank value is measured and the value is compared with cell blank value A each time. On the next business day, or the fifth day, the cycle returns to the first day; therefore, soaking and washing is performed for reaction container number 211 and cell blank measurement is made together. At this time, cell blank value A is updated with newly measured cell blank value B, which is stored in the storage unit 19. Each time an analysis is thereafter similarly made, a water blank value is measured and compared with cell blank value B each time.

In other words, the control unit 18 measures the degree of contamination in a reaction container with purified water delivered thereto as a cell blank value, updates the degree of contamination measured beforehand with the newly measured degree of contamination before a detergent is dispensed, and uses the updated degree of contamination as a basis for determining whether the relevant reaction container should be used in the subsequent analysis or not.

As mentioned up to this point, according to this embodiment, conventional reaction container washing and maintenance of cell blank measurement are performed with a number of reaction containers divided and an item analysis is also made at the same time. As a result, it is possible to make an analysis based on emergent item measurement and for an operator to apply him/herself to his/her work without delaying a report of a clinical result. Soaking and washing of reaction containers and cell blank measurement (and subsequent updating of a cell blank value) are automatically performed regardless of whether a start button of the analyzer is pressed or not and without completely stopping an analysis. As a result, an operator can effectively operate the analyzer.

In the above description, a case where a sample is dispensed first and then a reagent is dispensed into a reaction container is taken as an example. However, the present invention is also applicable to an analyzer so configured that a reagent is dispensed first and then a sample is dispensed. In this case, a control can be exerted in such a manner that a detergent is dispensed first and then a sample is not dispensed.

DESCRIPTION OF REFERENCE NUMERALS AND SIGNS

1: Automatic analyzer
2: Sample disk
3: Sample container
4: Reaction disk
5: Reaction container
6: Sample dispensation mechanism
7: Reagent disk
8: Reagent container
9: Reagent dispensation mechanism
10: Agitation mechanism
11: Light source
12: Photometer
13: A/D converter
14: Reaction container washing mechanism
15: Dispensation nozzle washing mechanism
16: Communication means
17: Interface
18: Control unit
19: Storage unit
20: Display unit
55: Number-of-days input box
56: Pull-down box

The invention claimed is:

1. An automatic analyzer, comprising:
a reaction disk having a plurality of reaction containers mounted thereon;
a reagent disk having a reagent container storing a reagent mounted thereon and having a container storing a detergent mounted thereon;
a reagent dispensation mechanism configured to dispense the reagent stored in the reagent container and dispense the detergent stored in the container to the reaction containers;
a sample container transport mechanism transporting a sample container storing a sample;
a sample dispensation mechanism dispensing the sample stored in the sample container to the reaction containers; and
a control unit controlling the reaction disk, the reagent disk, the reagent dispensation mechanism, the sample container transport mechanism, and the sample dispensation mechanism,
wherein the control unit is programmed to:
receive an input indicating a number of days in which all of the reaction containers are to be cleaned, the number of days being greater than two,
determine an order of washing the reaction containers mounted on the reaction disk, which includes determining individual reaction containers that are cleaning targets for each consecutive day of the number of days such that all the reaction containers mounted on the reaction disk are to be cleaning targets once within the number of days and that all the reaction containers that are cleaning targets in a single day of the consecutive days do not continuously reach a sample dispensation position of the sample dispensation mechanism, and such that two or more reaction containers mounted on the reaction disk that are not cleaning targets in the single day reach the sample dispensation position between respective reaction containers that are the cleaning targets in the single day, and samples are dispensed into each of the two or more reaction containers at the sample dispensation position by the sample dispensation mechanism,
control the sample dispensation mechanism, the reaction disk, and the reagent dispensation mechanism in such a manner that during an operation state after the sample to be analyzed is dispensed to the reaction containers, the sample is analyzed, and the detergent is dispensed to the reaction containers that are the cleaning targets by the reagent dispensation mechanism of each day of the number of days, and
control the sample dispensation mechanism, the reaction disk, and the reagent dispensation mechanism in such a manner that the sample is dispensed to the reaction containers at intervals which are between the dispensations of the detergent to all of the reaction containers that are the cleaning targets of each day of the number of days.

2. The automatic analyzer according to claim 1,
wherein the reaction containers are determined as the cleaning targets for each day of the number of days such that the reaction containers that are the cleaning targets in a single day of each day of the number of days reach the sample dispensation position at regular intervals, and
the control unit is further programmed to control the sample dispensation mechanism, the reaction disk, and the reagent dispensation mechanism such that, for each day of the number of days the detergent is regularly dispensed to the reaction containers that are the cleaning targets, at intervals between the dispensation of the sample to the reaction containers to soak and wash the reaction containers for a period of time.

3. The automatic analyzer according to claim 1,
wherein the control unit is programmed to control the reaction disk to continuously and repeatedly rotate the reaction disk by a predetermined number of reaction containers within one operation cycle, and determine a storage unit stores a group of the adjacent reaction containers which are the reaction containers of cleaning target in a single day as the reaction containers of cleaning target in a condition that positions of the reaction containers are shifted by one reaction container from original positions after passage of n operation cycles, where n is an integer equal to or greater than 2, and
a dispensing not the sample but the detergent regularly once means dispensing not the sample but the detergent once within the n operation cycles, and the control unit controls the sample dispensation mechanism, the reaction disk, and the reagent dispensation mechanism on the basis of the reaction containers of cleaning target of the appointed day, the reaction containers of cleaning target of the appointed day being stored in the storage unit, in such a manner that the detergent is dispensed to the group of the adjacent reaction containers to soak and wash the group of the adjacent reaction containers for a period of time.

4. The automatic analyzer according to claim 3, further comprising a display unit setting a number of the plurality of days within which all the reaction containers are to be cleaning targets as the number of days of a washing cycle for the reaction containers, wherein the control unit sets the number of the reaction containers to be cleaning targets by day unit, on the basis of the number of days set by the display unit, and stores in the storage unit the reaction containers of cleaning target in a single day, on the basis of the set number of reaction containers.

5. The automatic analyzer according to claim 1, wherein when the number of days is m, where m is an integer equal to or greater than 2, the control unit assigns the reaction containers of cleaning target of each day from a first day to an m-th day, and the control unit controls the sample dispensation mechanism, the reaction disk, and the reagent dispensation mechanism in such a manner that the detergent is dispensed to the assigned reaction containers of cleaning target of each day, and thus after m days, the detergent is dispensed to all the reaction containers to soak and wash all the reaction containers for a period of time.

6. The automatic analyzer according to claim 5, wherein when maintenance is conducted such that the detergent is dispensed to all the reaction containers to soak and wash all the reaction containers in a day on the basis of an operator's indication, the control unit newly assigns the reaction containers of cleaning target of each day with a next day assumed as the first day or a second day.

7. The automatic analyzer according to claim 5, wherein the control unit counts the first day to the m-th day on the basis of an actual date or a day on which the automatic analyzer is powered on.

8. The automatic analyzer according to claim 7, wherein the control unit controls the sample dispensation mechanism, the reaction disk, and the reagent dispensation mechanism in such a manner that when the detergent is not dispensed to the assigned reaction containers of cleaning target within the appointed day and the appointed day passes, then on a next day, the detergent is dispensed to a group of remaining reaction containers of cleaning target assigned on a previous day and to the reaction containers of cleaning target assigned on the next day, to soak and wash the reaction containers for a period of time.

9. The automatic analyzer according to claim 1, further comprising a reaction container washing mechanism suctioning the detergent dispensed to the reaction containers and discharging purified water to the reaction containers, wherein the control unit measures a degree of contamination of the reaction containers to which the purified water is discharged, and then updates the degree of contamination measured in advance before the detergent is dispensed to a newly measured degree of contamination, and the control unit uses the updated degree of contamination as a criterion for determination as to whether to use the reaction containers in a subsequent analysis.

10. The automatic analyzer according to claim 5, further comprising a reaction container washing mechanism suctioning the detergent dispensed to the reaction containers and discharging purified water to the reaction containers, wherein the control unit measures a degree of contamination of the reaction containers to which the purified water is discharged, and then updates the degree of contamination measured in advance before the detergent is dispensed to a newly measured degree of contamination, and the control unit uses the updated degree of contamination as a criterion for determination as to whether to use the reaction containers in a subsequent analysis.

11. The automatic analyzer according to claim 1, wherein the control unit controls the sample dispensation mechanism and the reaction disk in such a manner that the sample is dispensed to the reaction containers once the detergent is dispensed to the reaction containers and the reaction containers are soaked and washed for a period of time.

12. The automatic analyzer according to claim 1, further comprising:

a light source radiating light to the reaction containers; and a photometer detecting the light radiated by the light source, wherein the control unit outputs a result of an analysis of a component of analysis object contained in the sample dispensed to the reaction containers on the basis of a measurement result of the photometer.

* * * * *